(12) United States Patent
Sugimoto

(10) Patent No.: US 9,904,084 B2
(45) Date of Patent: Feb. 27, 2018

(54) DISPLAY APPARATUS

(71) Applicant: Sakai Display Products Corporation, Sakai-shi, Osaka (JP)

(72) Inventor: Arimasa Sugimoto, Sakai (JP)

(73) Assignee: SAKAI DISPLAY PRODUCTS CORPORATION, Osaka (JP)

( * ) Notice: Subject to any disclaimer, the term of this patent is extended or adjusted under 35 U.S.C. 154(b) by 31 days.

(21) Appl. No.: 15/032,557

(22) PCT Filed: Oct. 30, 2013

(86) PCT No.: PCT/JP2013/079394
§ 371 (c)(1),
(2) Date: Apr. 27, 2016

(87) PCT Pub. No.: WO2015/063883
PCT Pub. Date: May 7, 2015

(65) Prior Publication Data
US 2016/0259202 A1    Sep. 8, 2016

(51) Int. Cl.
*H05K 5/00* (2006.01)
*G02F 1/1333* (2006.01)

(52) U.S. Cl.
CPC .. *G02F 1/133308* (2013.01); *G02F 1/133385* (2013.01); *G02F 2001/133317* (2013.01); *G02F 2201/503* (2013.01)

(58) Field of Classification Search
CPC ......... G02F 1/133308; G02F 1/133385; G02F 2001/133317; G02F 2201/503
See application file for complete search history.

(56) References Cited

U.S. PATENT DOCUMENTS

| 2001/0050732 A1 | 12/2001 | Okamoto et al. |
| 2002/0113918 A1 | 8/2002 | Hiratsuka et al. |
| 2011/0085107 A1 | 4/2011 | Noh et al. |

FOREIGN PATENT DOCUMENTS

| JP | H08-327983 A | 12/1996 |
| JP | 2001-356321 A | 12/2001 |
| JP | 2002-258770 A | 9/2002 |
| JP | 2002-341318 A | 11/2002 |

(Continued)

*Primary Examiner* — James Wu
*Assistant Examiner* — Hung Dang
(74) *Attorney, Agent, or Firm* — Bret E. Field; Bozicevic, Field & Francis LLP

(57) ABSTRACT

The present invention provides a display apparatus capable of reliably mounting at least one of a holding member and a bezel to a holding plate with no damage to a light emitting element mounting substrate by a simple structure without providing a mounting member, and coping with an increase in an area of a driving circuit board disposed to the holding member. The display module of a TV receiving apparatus includes a light guide plate, a holding plate which holds a substrate having a plurality of LEDs, and is disposed to face a side surface of the light guide plate, a display panel disposed to face a main surface of the light guide plate, a holding member which covers the holding plate and holds the display panel, and a bezel which covers a peripheral edge part of the display panel and the holding member. The holding plate is provided with a mounting part which extends and protrudes in a direction which is away from the display panel, and at least one of the holding member and the bezel is mounted to the mounting part by a screw.

18 Claims, 14 Drawing Sheets

(56) References Cited

FOREIGN PATENT DOCUMENTS

| JP | 2005-352039 A | 12/2005 |
|----|---------------|---------|
| JP | 2011-082176 A | 4/2011 |
| JP | 2013-174705 A | 9/2013 |

F I G. 8
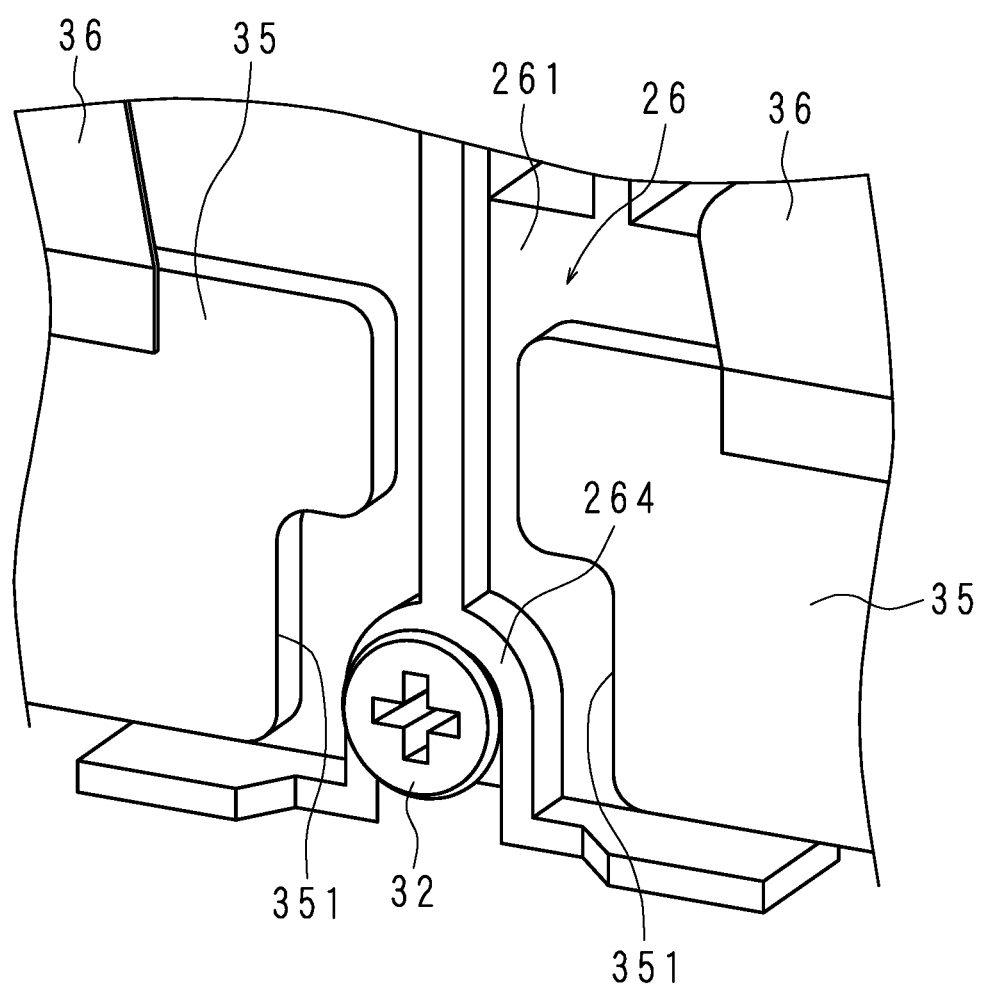

DISPLAY APPARATUS

CROSS-REFERENCE TO RELATED APPLICATIONS

This application is the national phase under 35 U.S.C. § 371 of PCT International Application No. PCT/JP2013/079394 which has an International filing date of Oct. 30, 2013 and designated the United States of America.

BACKGROUND

1. Technical Field

The present invention relates to a display apparatus having an edge light type backlight.

2. Description of Related Art

A liquid crystal display apparatus has characteristics such as thin, and low power consumption, recently, due to an improvement of display quality thereof, has been widely distributed as a display alternative to a conventional CRT, and is widely used as an image display apparatus of a television receiving apparatus (hereinafter, referred to as a TV receiving apparatus). Unlike a self-luminous device, the liquid crystal display apparatus needs a backlight as a light source, and displays an image by controlling light transmittance which is determined by electro-optical characteristics of liquid crystals.

The backlight has types of an edge light type (side light type, or light guide plate type), and a direct type.

As a liquid crystal display apparatus having the edge light type backlight, in order to achieve thinning, weight lightening, and narrowing of a frame, there may be a display apparatus in which a backlight unit formed by housing a light guide plate, optical sheets, and a light emitting diode (LED) substrate in a rectangular box-shaped chassis is disposed at a back surface of a liquid crystal display panel (hereinafter, referred to as a display panel) to form a display module, and the display module is covered with a frame. The LED substrate includes a plurality of LEDs mounted on a flat surface of an elongated substrate. When the backlight unit is an edge light type from one side, the LED substrate is disposed to face, for example, one long side surface of a rectangular plate-shaped light guide plate. Light which is emitted from the LEDs and has entered from the long side surface of the light guide plate is emitted from a main surface of the light guide plate, and the back surface of the liquid crystal panel is irradiated with the light.

There are cases that the LED substrate is mounted on a side plate facing the long side surface of the light guide plate of the chassis; and the LED substrate is mounted on a short side portion of an LED holding plate formed in an L shape in a side view, while the chassis does not have the side plate. In the latter case, the long side portion of the LED holding plate is connected to the chassis.

The display panel is configured so as to be held by a holding member formed in a rectangular plate shape, and the holding member covers the LED substrate, as well as the LED holding plate.

In addition, a peripheral edge part of the display panel and the holding member are covered with a bezel formed in a rectangular plate shape.

In order to fix the holding member and the bezel to a portion which holds the LED substrate of the backlight unit such as the LED holding plate, screws are used.

There are restrictions on a design of the above-described thinning and narrowing of a frame, and recently, to realize high resolution and high definition such as 4K2K, a source substrate, or the like which is disposed on an outer surface of the holding member is increased in a size (increased in an area). Thereby, there is a problem that, when the LED substrate is disposed on an inner surface inside of the outer surface of the holding member, it is not possible to sufficiently secure a space for fixing the screws.

As a liquid crystal display apparatus which has achieved narrowing of the frame, there is an invention disclosed in Japanese Patent Laid-Open Publication No. 2001-356321.

FIG. 13 is a partial cross-sectional view illustrating a liquid crystal display apparatus of Japanese Patent Laid-Open Publication No. 2001-356321.

The liquid crystal display apparatus includes a display panel 21, a holding member 26, a bezel 27, and a mounting member 39. The holding member 26 has a side part, and holds the display panel 21. The bezel 27 has a front plate 272 which covers a peripheral edge part of the display panel 21, and a side plate 271 which extends substantially parallel to the side part of the holding member 26, and has a screw insertion hole 275. The mounting member 39 is formed in substantially a U shape, is detachably mounted on the side part of the holding member 26, and has a female screw 391 to which a screw 40 inserted into the screw insertion hole 275 of the bezel 27 is screwed.

The display apparatus includes the mounting member 39 as described above, and a frame region is reduced by as much as an amount disposing the mounting member 39, such that there are problems of not being able to narrow the frame, as well as an increase in manufacturing costs.

In addition, the mounting member 39 formed in substantially a U shape is configured to be screwed to the side part of the holding member 26, and it is conceivable that, when fastening the screw 40 to the female screw 391, a positional shift may occur therebetween, and fixation of the mounting member 39 to the holding member 26 may be weakened.

Further, the mounting structure has a problem that it is not possible to cope with a demand for disposing a plurality of source substrates while decreasing an interval between the outer surface of the holding member 26.

FIG. 14 is a partial cross-sectional view illustrating another conventional display module.

The display module includes a display panel 21, an optical sheet group 22 including, for example, three optical sheets, a light guide plate 23, a holding plate 24, a holding member 26, a bezel 27, an LED substrate 30, a reflection sheet 38, and a mounting member 41.

The LED substrate 30 including a plurality of LEDs 31 mounted thereon is supported by the holding plate 24, with being disposed to face a long side surface of the light guide plate 23.

The holding plate 24 is made of, for example, aluminum, and includes a lower plate part 241 which covers a lower long side surface of the light guide plate 23, and a back plate part 242 which is provided perpendicular to the lower plate part 241 and extends in a longitudinal direction of the light guide plate 23.

The reflection sheet 38 is a white sheet, and is made of, for example, a resin material having an optical reflectivity such as polyethylene terephthalate (PET), polycarbonate (PC) or the like. The reflection sheet 38 is provided at the back plate part 242 through a spacer 29. The reflection sheet 38 is provided on the outer surface of the light guide plate 23.

The optical sheet group 22 is a sheet group including a diffusion sheet, lens sheet, reflection type polarizing sheet, and the like, and is disposed at a front of the main surface of the light guide plate 23.

The holding member 26 has a lower plate part 261, a panel abutting part 262, and a sheet abutting part 263.

The lower plate part 261 extends in a horizontal direction, and abuts the lower plate part 241 of the holding plate 24 to support the lower plate part 241. The lower plate part 261 has four source substrates (not illustrated) disposed beside a lower surface thereof. A screw insertion hole 268 is provided in a gap portion of the lower plate part 241, in which an adjacent source substrate is disposed.

The panel abutting part 262 is erected on the lower plate part 261, and abuts against a lower end edge part of a back surface of the display panel 21 through a buffer member 33.

The sheet abutting part 263 extends from an upper side of the panel abutting part 262, and a back surface of the sheet abutting part 263 abuts on a lower portion of a front surface of the optical sheet group 22 through a buffer member 34.

The bezel 27 is a frame body formed in an L shape in the side view, and has a side plate 271, and a front plate 272. The side plate 271 extends in the horizontal direction, and covers the source substrate and the lower plate part 261 of the holding member 26. The front plate 272 is provided perpendicular to the side plate 271, and the back surface thereof abuts a lower end edge part of the front surface of the display panel 21 through a buffer member 28. The front plate 272 is provided with a plurality of screw insertion holes 278 in the lower portion thereof.

The mounting member 41 is provided with a plurality of female screws 411 in the lower portion thereof. The mounting member 41 is mounted on the back surface of the back plate part 242 of the holding plate 24.

In addition, the bezel 27 and the holding member 26 are configured so as to be mounted to the holding plate 24, by inserting a screw 42 into the screw insertion holes 278 and 268 to be screwed to the female screws 411.

The display module has problems that, since the mounting member 41 is provided, a thickness of the display module is thickened and the manufacturing costs are increased, as well as, since the screw insertion structure is provided in the gap between the lower plate part 261 of the holding member 26, in which the source substrate is disposed, it is not possible to cope with a demand for decreasing the gap.

As a fixing structure of another bezel 27 and the holding member 26 to the holding plate 24, there is a structure in which a stud is caulked to the lower plate part 241 of the holding plate 24, a female screw is formed in the stud, a screw penetrates the side plate 271 from an outside of the side plate 271 of the bezel 27, and in this state, the screw is screwed to the female screw.

In this case, there are problems that, since the stud is provided in the lower plate part 241, manufacturing processes become complicated, and since the screw insertion structure is provided in the gap between the lower plate part 261, in which the source substrate is disposed, it is not possible to cope with a demand for decreasing the gap.

Further, as a fixing structure of the bezel 27 and the holding member 26 to the backlight unit, a structure, in which a female screw is provided in a gap between LEDs 31 of the LED substrate 30, a screw penetrates the side plate 271 from the outside of the side plate 271 of the bezel 27, and in this state, the screw is screwed to the female screw, may be conceived.

In this case, there are problems that, engagement of the screw to the female screw is decreased, and the screw abuts on the LED substrate 30, such that the LED substrate 30 may be damaged.

SUMMARY

In consideration of the above-mentioned problems, it is an object of the present invention to provide a display apparatus which is capable of reliably mounting at least one of a holding member and a bezel to a holding plate with no damage to a light emitting element mounting substrate by a simple structure without adding a separate part for mounting, and coping with an increase in an area of a driving circuit board disposed to the holding member.

A display apparatus according to one embodiment of the present invention comprises: a light guide plate; a holding plate which holds a substrate having a plurality of light emitting elements, and is disposed to face a side surface of the light guide plate; a display panel disposed to face a main surface of the light guide plate; a holding member which holds the display panel and covers the holding plate; and a bezel which covers a peripheral edge part of the display panel and the holding member, wherein the holding plate is provided with a mounting part which extends and protrudes in a direction which is away from the display panel, and at least one of the holding member and the bezel is mounted to the mounting part by a fastener.

According to the embodiment, without newly providing a member for mounting, by changing a shape of the holding plate, a mounting structure of at least one of the holding member and the bezel to the holding plate is obtained, and when the fastener is, for example, a screw, it is possible to minimize a positional shift between a female screw and a screw insertion hole, and maintain a strength of fixation.

In addition, the mounting part is located at a rearward region from a position in which a substrate having light emitting elements is disposed, and is apart from a portion in which the substrate having the light emitting elements is disposed to have a complicated mounting structure, and thereby, it is possible to easily and reliably fix at least one of the holding member and the bezel to the holding plate, and narrow the frame.

Further, when disposing the driving circuit board such as a source substrate to the holding member, it is possible to cope with an increase in an area of the driving circuit board.

The display apparatus according to one embodiment of the present invention may comprise a covering plate which covers a flat surface of the light guide plate, and is provided perpendicular to the holding plate.

According to the embodiment, it is possible to stably dissipate heat generated by the light emitting elements.

In the display apparatus according to one embodiment of the present invention, the holding member may be provided, on the outside of the portion with which the holding plate is covered, with a plurality of driving circuit boards to drive the display panel, and a portion between the driving circuit boards of the holding member may be mounted to the mounting part by the fastener.

According to the embodiment, the mounting position by the fastener is located between the driving circuit boards, and is located at a forward region, rather than a rearward region from an end portion of the back side of the driving circuit board, such that it is possible to narrow a thickness of the display apparatus. In addition, a width (vertical width) of the driving circuit board is not restricted by the mounting structure, such that it is possible to increase the width thereof, and cope with an increase in the size of the driving circuit board.

In the display apparatus according to one embodiment of the present invention, the holding member may be provided, on the outside of the portion with which the holding plate is covered, with a plurality of driving circuit boards to drive the display panel, the driving circuit board has a concave on the distal part from the display panel in a portion facing the adjacent driving circuit board, and the portion of the holding member corresponding to the concave may be mounted to the mounting part by the fastener.

According to the embodiment, the driving circuit board has the concave part on the distal region in the portion facing the adjacent driving circuit board, and the mounting structure is disposed in the concave part. Accordingly, the front portions of the concave parts of the driving circuit boards may be disposed closely each other, and the area of the driving circuit boards may be increased.

In the display apparatus according to one embodiment of the present invention, the holding member may be provided, on the outside of the portion with which the holding plate is covered, with a plurality of driving circuit boards to drive the display panel, and an end portion in the longitudinal direction of the holding member in which the driving circuit board is not provided may be mounted to the mounting part by the fastener.

According to the embodiment, the driving circuit board may be fixed to the holding member, without being restricted to the mounting structure.

In the display apparatus according to one embodiment of the present invention, the holding member may be provided, on the outside of the portion with which the holding plate is covered, with a plurality of driving circuit boards to drive the display panel, and with respect to the portion in which the driving circuit board of the holding member is provided, the distal portion from the display panel may be mounted to the mounting part by the fastener.

According to the embodiment, the driving circuit board may be fixed to the holding member, without being restricted to the mounting structure.

In the display apparatus according to one embodiment of the present invention, the mounting part may be provided with an abutting part which protrudes in a direction close to the bezel to abut on a rear surface of the bezel.

According to the embodiment, the abutting part abuts on a rear surface of the bezel, such that, when mounting the bezel to the holding plate by the fastener, the front portion of the bezel being opened outwardly is prevented.

In the display apparatus according to one embodiment of the present invention, the mounting part may be provided with fins to dissipate heat.

According to the embodiment, it is possible to stably dissipate heat from the light emitting elements.

According to the present invention, since the holding plate is provided with the mounting part which extends and protrudes to the rearward region, and at least one of the holding member and the bezel is configured so as to be mounted to the mounting part by the fastener, it is possible to reliably mount at least one of the holding member and the bezel to the holding plate with no damage to the light emitting element mounting substrate by a simple structure, without newly providing a mounting part. In addition, it is possible to cope with an increase in the area of the driving circuit board disposed to the holding member.

The above and further objects and features will more fully be apparent from the following detailed description with accompanying drawings.

BRIEF DESCRIPTION OF THE SEVERAL VIEWS OF THE DRAWINGS

FIG. 8 is a partial perspective view illustrating a holding member according to Embodiment 4 of the present invention.

DETAILED DESCRIPTION

Embodiment 1

Figure 1:
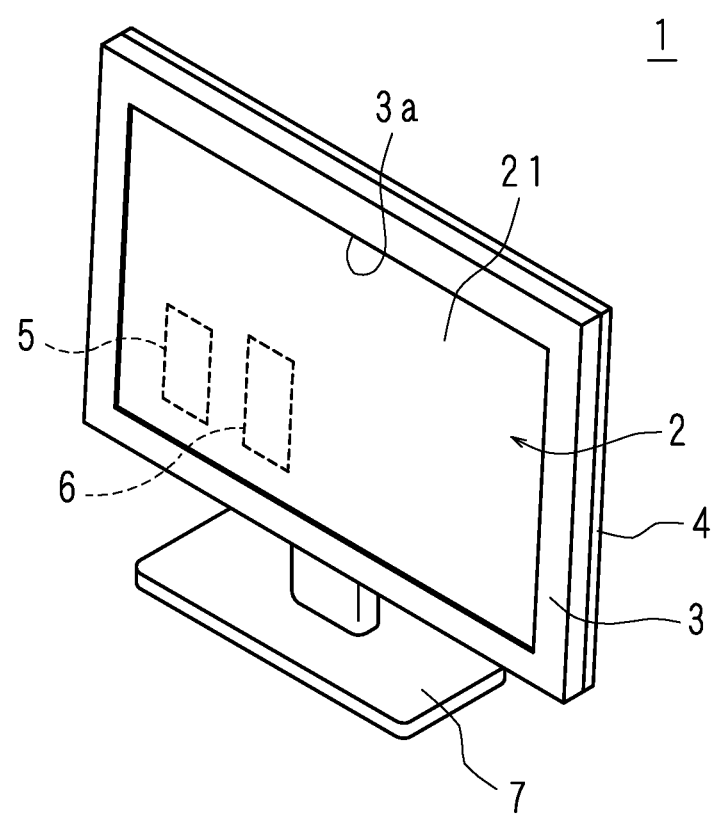
FIG. 1 is a front perspective view illustrating an appearance of a TV receiving apparatus according to Embodiment 1 of the present invention.
Figure 2:
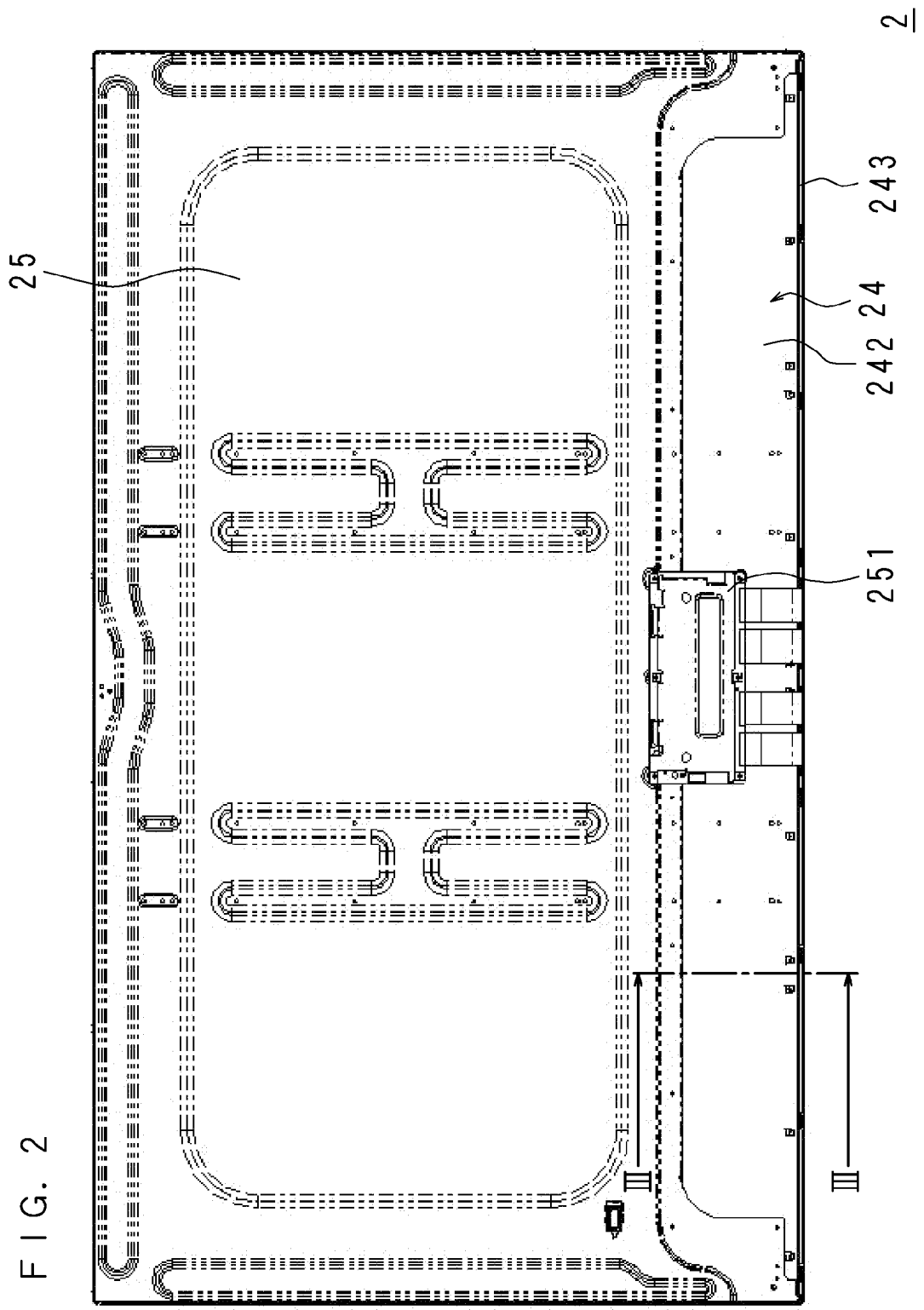
FIG. 2 is a rear view illustrating a display module according to Embodiment 1 of the present invention.
Figure 3:
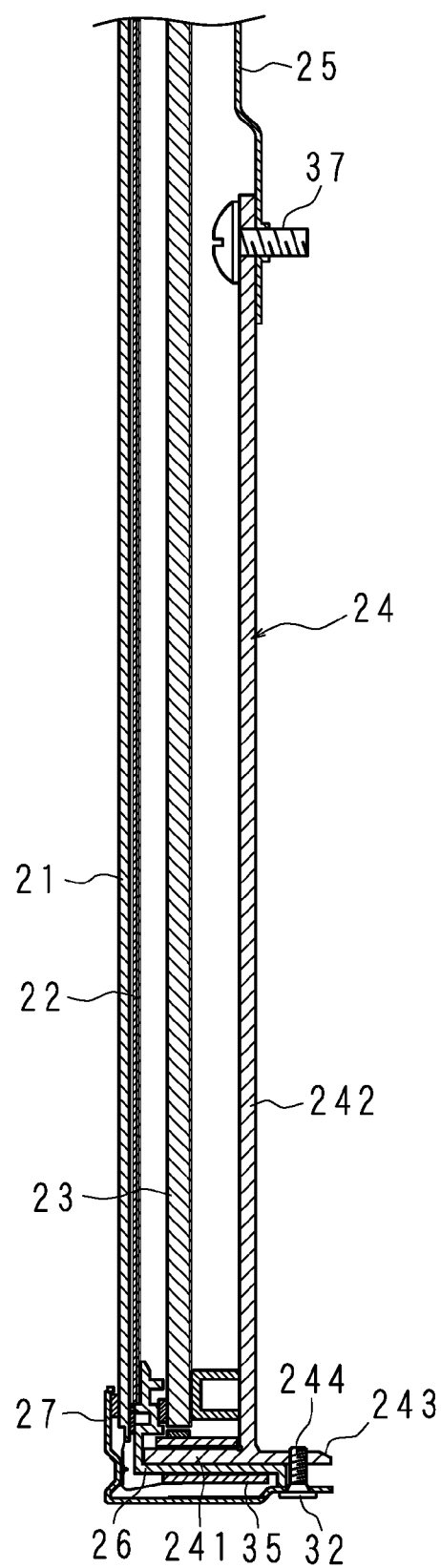
FIG. 3 is a cross-sectional view taken on line III-III of FIG. 2.
Figure 4:
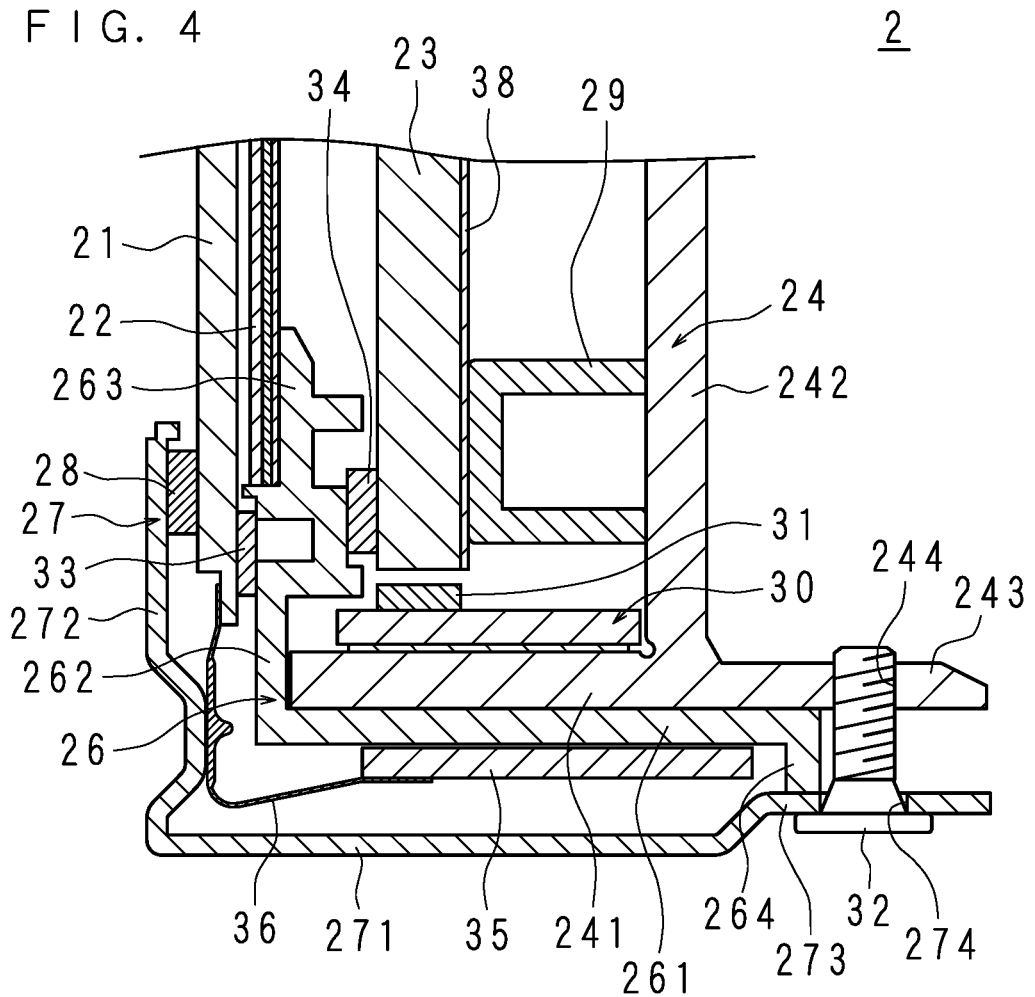
FIG. 4 is a partial sectional view in the longitudinal direction illustrating the display module according to Embodiment 1 of the present invention.

FIG. 1 is a front perspective view illustrating an appearance of a TV receiving apparatus 1 according to Embodiment 1 of the present invention, FIG. 2 is a rear view illustrating a display module 2, FIG. 3 is a cross-sectional view taken on line III-III of FIG. 2, and FIG. 4 is a partial sectional view in the longitudinal direction illustrating the display module 2.

The TV receiving apparatus 1 includes the laterally long display module 2 which has a display panel 21 for displaying an image thereon, a tuner 5 which receives a broadcast wave from an antenna (not illustrated), and a decoder 6 which decodes the encoded broadcast wave. In the TV receiving apparatus 1, the decoder 6 decodes the broadcast wave received by the tuner 5, and the display module 2 displays an image based on decoded information. The TV receiving apparatus 1 is provided with a stand 7 for supporting the TV receiving apparatus 1 at a lower side thereof.

The display module 2 is housed in a vertical position between a front cabinet 3 and a rear cabinet 4 which are disposed in back and front in the vertical position. The front cabinet 3 is a rectangular frame body which covers a peripheral edge part of the display module 2, and has a rectangular opening 3a in the center thereof. The front cabinet 3 is made of, for example, a synthetic resin. The rear cabinet 4 is formed in a shape of a rectangular tray of which the front being opened, and is made of, for example, a synthetic resin. Further, the front cabinet 3 and the rear cabinet 4 may be made of other material as well.

Vertical and lateral dimensions of the front cabinet 3 and the rear cabinet 4 are substantially the same as each other, and peripheral edge portions thereof face each other. The vertical and lateral dimensions of the display panel 21 are slightly larger than those of the opening 3a of the front cabinet 3, and the peripheral edge portions of the display panel 21 face inner edge portions of the front cabinet 3.

As illustrated in FIGS. 3 and 4, the display module 2 includes the display panel 21, an optical sheet group 22 including three optical sheets, for example, a light guide plate 23, a holding plate 24, a chassis 25, a holding member 26, a bezel 27, an LED substrate 30, a source substrate 35, and a reflection sheet 38.

A backlight unit is formed by the optical sheet group 22, the light guide plate 23, the holding plate 24, the chassis 25, the LED substrate 30, and the reflection sheet 38.

The display panel 21 includes a color filter substrate having a plurality of color filters, an active matrix substrate (a thin film transistor (hereinafter, referred to as a TFT) substrate) which is disposed to face the color filter substrate and has a plurality of TFTs which are active elements, and a liquid crystal layer provided between the color filter substrate and the active matrix substrate as a display medium layer.

The light guide plate 23 is formed in a rectangular plate shape (rectangular parallelepiped shape), and has a main surface facing the display panel 21, a rear surface which is an opposite surface of the main surface and faces the chassis 25, a pair of long side surfaces, and a pair of short side surfaces. In addition, a lower long side surface functions as a light incident surface for guiding light into the light guide plate 23, and the light guided from the long side surface into the light guide plate 23 is emitted toward the display panel 21 from the main surface (a light emitting surface) of the light guide plate 23.

The chassis 25 is made of, for example, iron, and is formed in a shape of a tray being opened towards the display panel 21.

As illustrated in FIGS. 2 and 3, a lower portion of the chassis 25 is connected with the holding plate 24 by using a plurality of screws 37.

The holding plate 24 is made of, for example, aluminum, and includes a lower plate part 241 which covers the lower long side surface of the light guide plate 23, a back plate part 242 which is provided perpendicular to the lower plate part 241 and extends in a longitudinal direction of the light guide plate 23, and a mounting part 243 which protrudes rearward from an end portion of the back side of the lower plate part 241. The mounting part 243 extends along a lower peripheral edge part of the lower plate part 241. The holding plate 24 is formed in a reverse T shape. The mounting part 243 is provided with a plurality of female screws 244.

The holding plate 24 is made of aluminum, and functions as a heat spreader to dissipate heat generated from LEDs 31.

Further, the mounting part 243 is not limited to the case of a continuous plate shape, and a plurality of mounting parts may be discontinuously provided depending on fastening positions of screws 32.

A main substrate holding member 251 is mounted at a lateral central part of a connection portion between the chassis 25 and the holding plate 24. The main substrate holding member 251 is provided with the tuner 5, a CPU and the like.

The optical sheet group 22, the light guide plate 23, and the LED substrate 30 are housed in the chassis 25 and the holding plate 24. Further, a light source of the backlight unit is not limited to the LED.

The reflection sheet 38 is a white sheet, and is made of, for example, a resin material having an optical reflectivity such as PET, PC or the like. The reflection sheet 38 is provided at the back plate part 242 of the holding plate 24 and a bottom of the chassis 25 through a plurality of spacers 29.

The reflection sheet 38 is provided on the outer surface of the light guide plate 23.

The optical sheet group 22 is a sheet group including a diffusion sheet, lens sheet, reflection type polarizing sheet, and the like, and is disposed at a front of the main surface of the light guide plate 23. In addition, the light emitted from the main surface of the light guide plate 23 is diffused, collected, or the like by the optical sheet group 22.

The LED substrate 30 includes a plurality of LEDs 31 mounted on the flat surface of the substrate made of, for example, aluminum to emit the light guided into the light guide plate 23, and as described above, is disposed beside a long side surface of the lower side of the light guide plate 23. The LED substrate 30 extends along the long side surface, and each LED 31 faces the long side surface of the light guide plate 23.

The LED substrate 30 is held on an upper surface of the lower plate part 241 of the holding plate 24.

The holding member 26 is a frame body made of, for example, a synthetic resin and formed in an L shape in a side view, and has a lower plate part 261, a panel abutting part 262, a sheet abutting part 263, and a bezel abutting part 264.

The lower plate part 261 extends in a horizontal direction, and abuts on the lower plate part 241 of the holding plate 24 to support the lower plate part 241. The lower plate part 261 has, for example, four source substrates 35 disposed beside a lower surface thereof. The source substrate 35 is connected to the active matrix substrate of the display panel 21 by a flexible wiring plate 36.

The panel abutting part 262 has an erected part which is erected on the lower plate part 261, and an abutting part which extends from an upper side of the erected part and is formed in a lateral U shape in the side view. In a state in which the buffer member 33 is applied to a U-shaped opening portion of the abutting part, the abutting part abuts the lower end edge part of the back surface of the display panel 21 to support the display panel 21. In addition, a back surface of the abutting part abuts on the lower end edge part of a front surface of the light guide plate 23 through a buffer member 34. Further, an upper surface of the abutting part abuts a lower surface of the optical sheet group 22 to support the optical sheet group 22.

The sheet abutting part 263 extends from an upper side of the panel abutting part 262, and abuts on a lower portion of a back surface of the optical sheet group 22.

The bezel abutting part 264 is vertically provided at an end portion of the back side of the lower plate part 261, and is configured so as to abut on a screw head locking 273 of the bezel 27 to be described below.

The bezel 27 is a frame body made of, for example, iron and formed in an L shape in the side view, and has a side plate 271, a front plate 272, and the screw head locking 273. The side plate 271 extends in the horizontal direction, and covers the source substrate 35, and the lower plate part 261 of the holding member 26. The front plate 272 is provided perpendicular to the side plate 271, and the back surface thereof abuts on the lower end edge part of the front surface of the display panel 21 through a buffer member 28. That is, the display panel 21 is sandwiched between the bezel 27 and the holding member 26 through the buffer members 28 and 33.

The side plate 271 is provided with the screw head locking 273 at an end portion of the back side thereof, which extends rearward with being recessed inwardly. The screw head locking 273 is provided with a screw insertion hole 274.

In the present embodiment, in a state in which a peripheral edge part of a head portion of a screw 32 is locked to the screw head locking 273, and a leg portion thereof is inserted into the screw insertion hole 274, the screw is screwed to a female screw 244 of the holding plate 24.

Thereby, both of the holding member 26 and the bezel 27 are fixed to the holding plate 24. That is, without newly providing a member, by changing a shape of the holding plate 24, a mounting structure of the holding member 26 and the bezel 27 to the holding plate 24 is obtained, as well as, it is possible to minimize a positional shift between the female screw 244 and the screw insertion hole 274, and maintain a strength of fixation.

A fastening position of the screw 32 is located at the rearward region from the source substrate 35, and is apart from a portion in which the LED substrate 30 is disposed to have a complicated mounting structure, such that it is possible to easily and reliably fix the holding member 26 and the bezel 27 to the holding plate 24, without being restricted to an arrangement of the source substrate 35. Further, it is possible to narrow the frame. Furthermore, by decreasing a gap between the source substrates 35, it is possible to cope with an increase in a size of the source substrate 35, and realize high resolution, etc.

Embodiment 2

A display module 12 according to Embodiment 2 of the present invention has the same configuration as the display module 2 according to Embodiment 1, except that the shape of a holding plate 24 is different therefrom.

Figure 5:
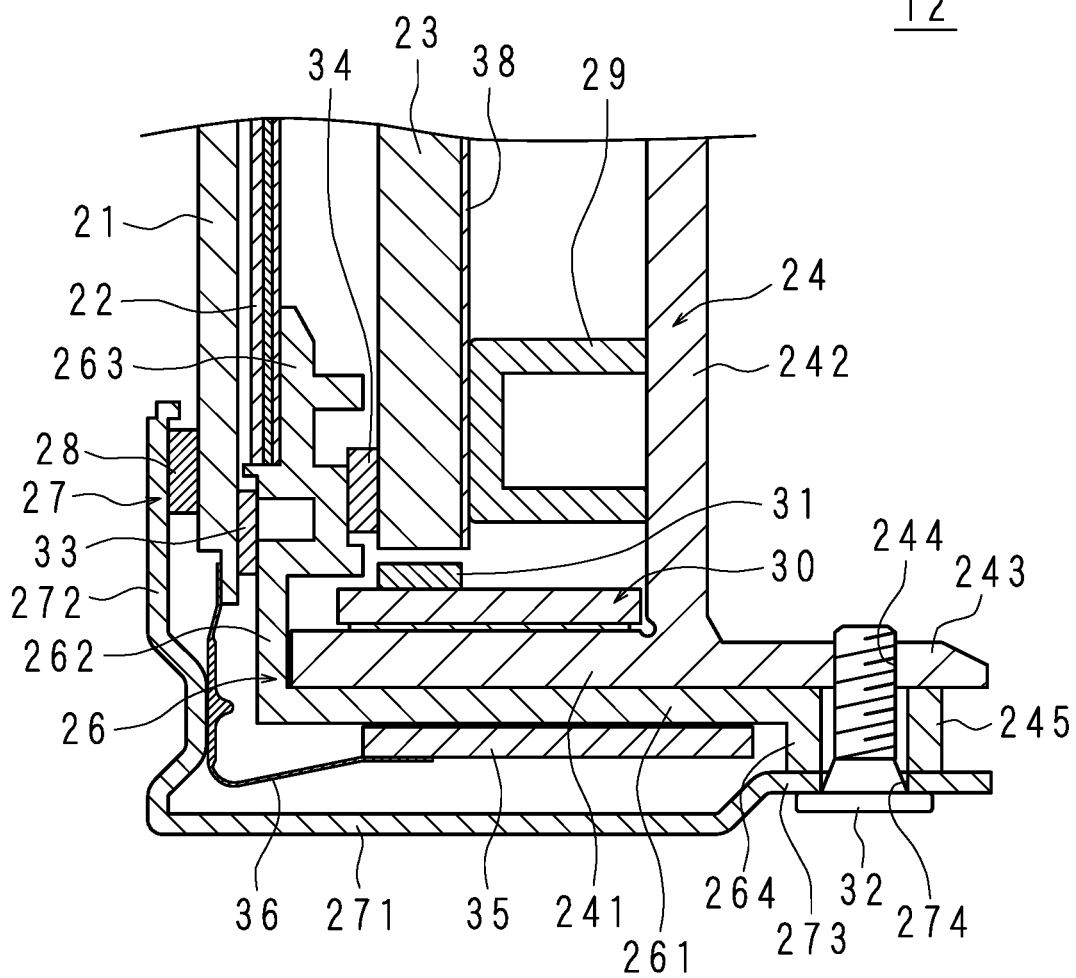
FIG. 5 is a partial sectional view in the longitudinal direction illustrating a display module according to Embodiment 2 of the present invention.

FIG. 5 is a partial sectional view in the longitudinal direction illustrating the display module 12 according to Embodiment 2. In the drawing, the same parts as FIG. 4 will be denoted by the same reference numerals, and will not be described.

The holding plate 24 is made of, for example, aluminum, and includes a lower plate part 241 which covers the lower long side surface of the light guide plate 23, a back plate part 242 which is provided perpendicular to the lower plate part 241 and extends in the longitudinal direction of the light guide plate 23, a mounting part 243 which protrudes rearward from an end portion of the back side of the lower plate part 241, and a bezel abutting part 245 which is provided perpendicular to the lower surface of the mounting part 243 and abuts on an upper surface of the screw head locking 273 of the bezel 27.

In the present embodiment, the bezel abutting part 245 abuts a rear surface of the screw head locking 273, such that, when fastening the screw 32 to the female screw 244 of the holding plate 24, the front plate 272 of the bezel 27 being opened outwardly is prevented.

Embodiment 3

A display module 13 according to Embodiment 3 of the present invention has the same configuration as the display module 2 according to Embodiment 1, except that the fastening position of the screw 32 is different therefrom.

Figure 6:
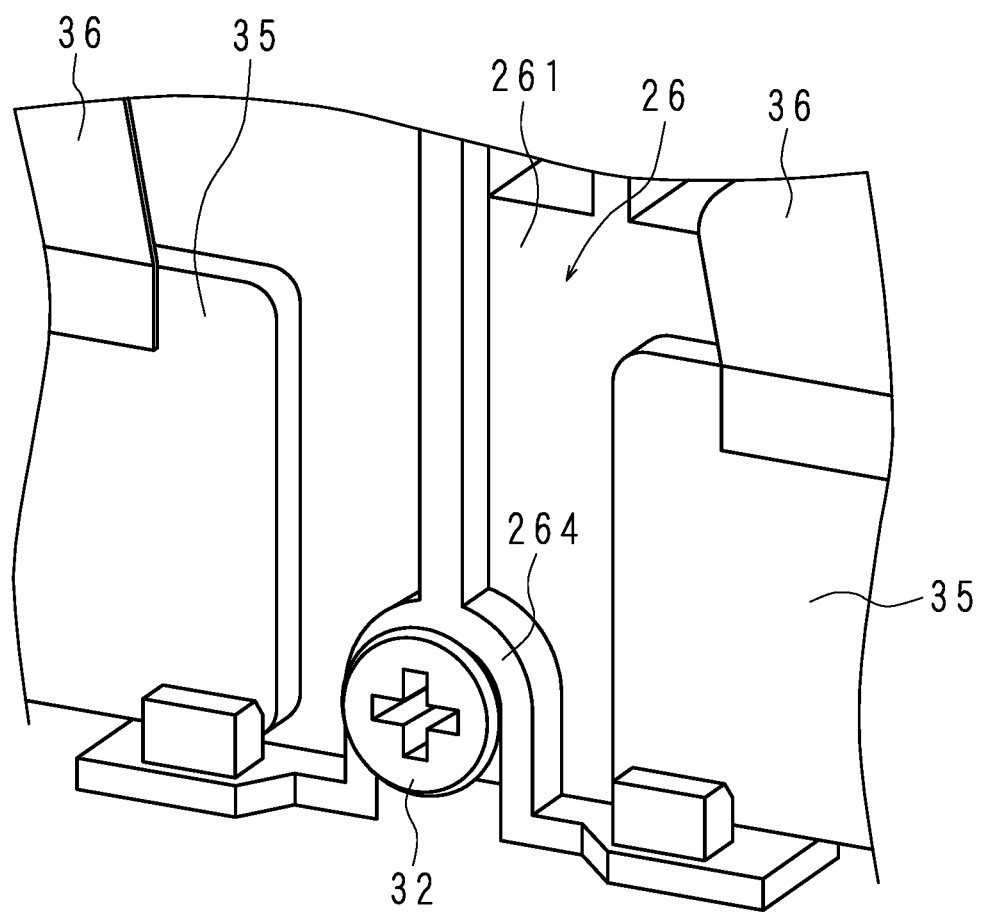
FIG. 6 is a partial perspective view illustrating a holding member of a display module according to Embodiment 3 of the present invention.
Figure 7:
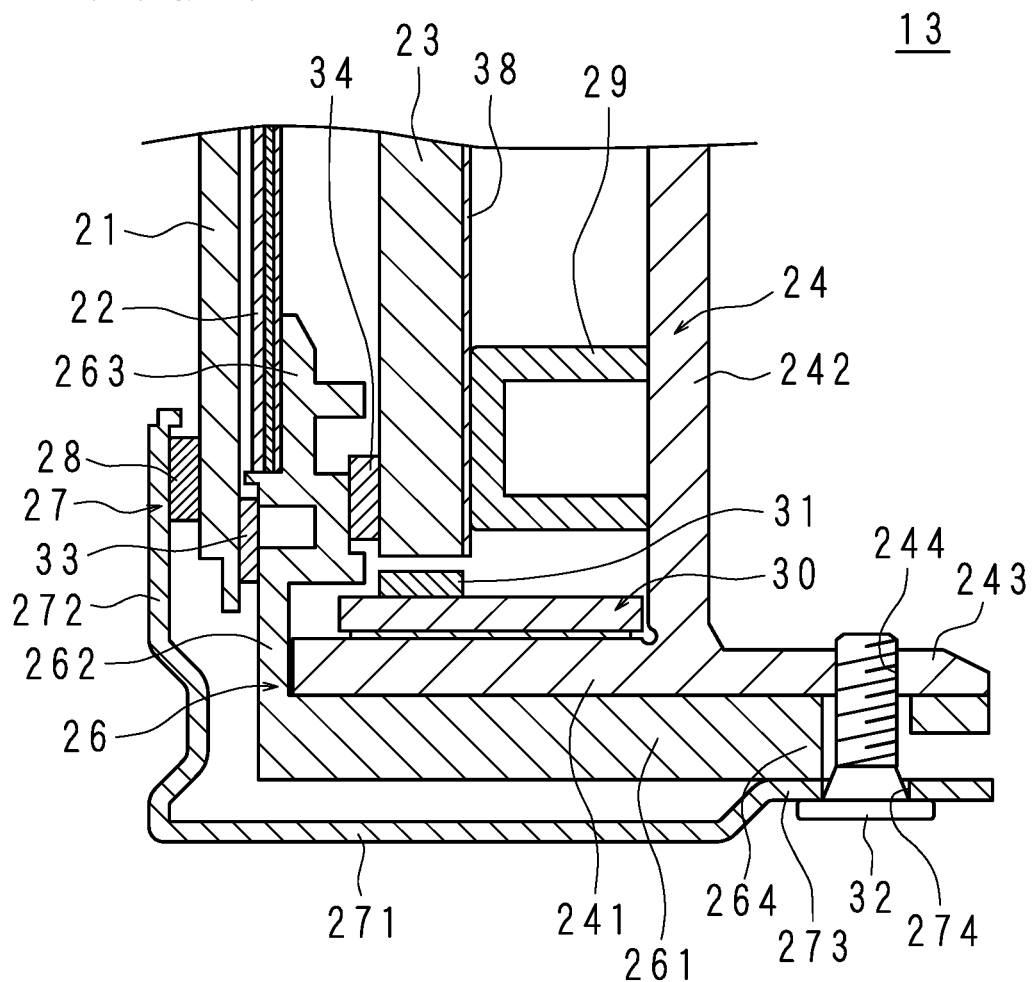
FIG. 7 is a partial sectional view in the longitudinal direction illustrating the display module according to Embodiment 3 of the present invention.

FIG. 6 is a partial perspective view illustrating a holding member 26 of the display module 13, and FIG. 7 is a partial sectional view in the longitudinal direction illustrating the display module 13. In the drawings, the same parts as FIG. 4 will be denoted by the same reference numerals, and will not be described.

A bezel abutting part 264 of the holding member 26 of the display module 13 includes a rectangular parallelepiped-shaped portion and a reverse U shaped-portion. The bezel 27 abuts on the bezel abutting part 264, then the screw 32 is inserted into the screw insertion hole 274 and the bezel abutting part 264, and is screwed to the female screw 244 of the mounting part 243, such that the bezel 27 and the holding member 26 are fixed to the holding plate 24.

As illustrated in FIG. 6, the source substrates 35 and 35 are disposed to the holding member 26, so that the source substrates 35 and 35 sandwich the bezel abutting part 264. That is, the fastening position of the screw 32 is located between the source substrates 35 and 35, and is located at a forward region, rather than a rearward region from an end portion of the back side of the source substrate 35 as Embodiment 1. Accordingly, a thickness of the display module 13 may be reduced. In addition, when the display module has the same thickness as the display module 2 according to Embodiment 1, it is possible to increase the width of the source substrate 35, and cope with an increase in the size of the source substrate 35.

Embodiment 4

A display module according to Embodiment 4 of the present invention has the same configuration as the display module 13 according to Embodiment 3, except that the shape of a source substrate 35 is different therefrom.

FIG. 8 is a partial perspective view illustrating a holding member 26 according to Embodiment 4. In the drawings, the same parts as FIG. 6 will be denoted by the same reference numerals, and will not be described. Furthermore, the display module has the same configuration of cross-section as the configuration of FIG. 7.

The source substrate 35 of the present embodiment has a notch 351 on a rearward region in a portion facing the adjacent source substrate 35. As illustrated in FIG. 8, the upper sides (front sides) of the notches 351 may be disposed closely each other, thereby it is possible to increase the area of the source substrate 35, and realize high resolution, etc.

Embodiment 5

A display module according to Embodiment 5 of the present invention has the same configuration as the display module 13 according to Embodiment 3, except that the fastening position of the screw 32 is different therefrom.

Figure 9:
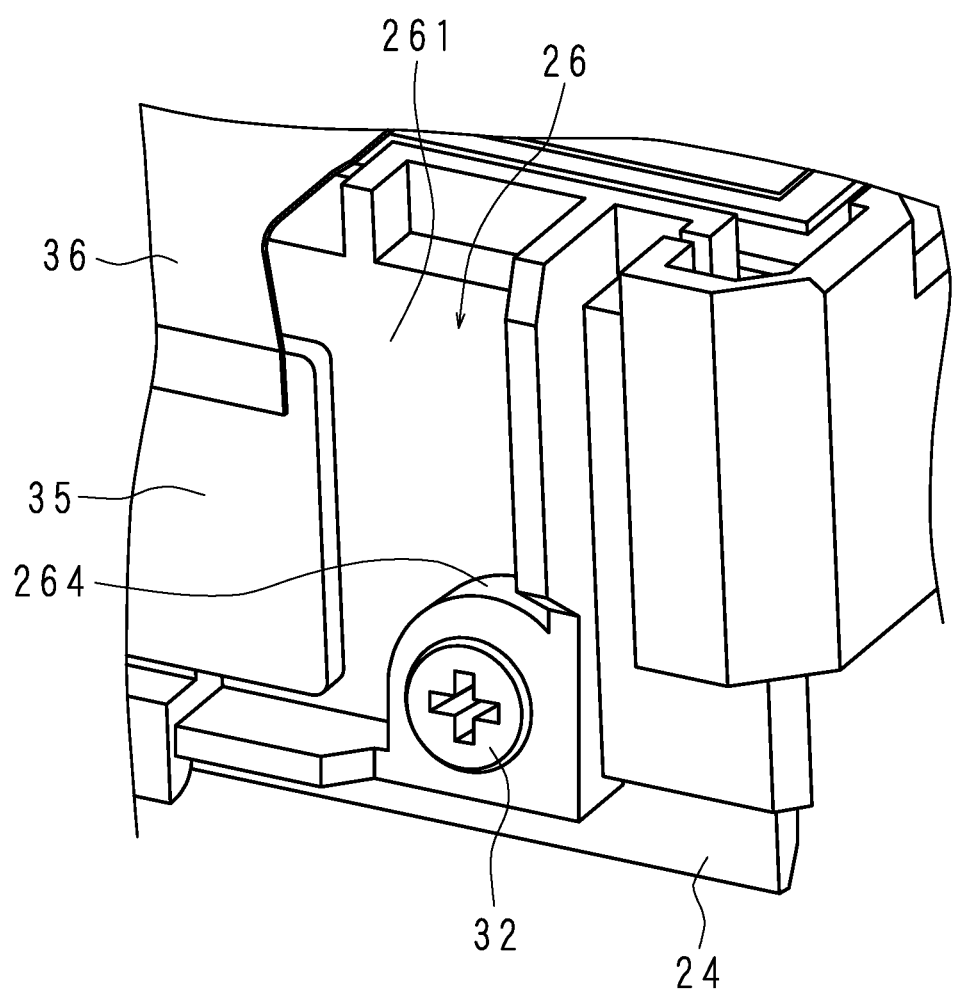
FIG. 9 is a partial perspective view illustrating a holding member according to Embodiment 5 of the present invention.

FIG. 9 is a partial perspective view illustrating a holding member 26 according to Embodiment 5. In the drawing, the same parts as FIG. 6 will be denoted by the same reference numerals, and will not be described. Furthermore, the display module has the same configuration of cross-section as the configuration of FIG. 7.

In the present embodiment, a bezel abutting part 264 is provided at a portion of both end portions in the lateral direction of the lower plate part 261, in which the source substrate 35 is not disposed. The bezel 27 abuts on the bezel abutting part 264, then the screw 32 is inserted into the screw insertion hole 274 and the bezel abutting part 264, and is screwed to the female screw 244 of the mounting part 243. That is, the fastening position of the screw 32 is located close to the end portion from the arrangement position of the source substrate 35, and the bezel 27 and the holding member 26 may be fixed to the holding plate 24, without being restricted to the arrangement of the source substrate 35.

Embodiment 6

A display module 14 according to Embodiment 6 of the present invention has the same configuration as the display module 2 according to Embodiment 1, except that the shape of a holding plate 24 is different therefrom.

Figure 10:
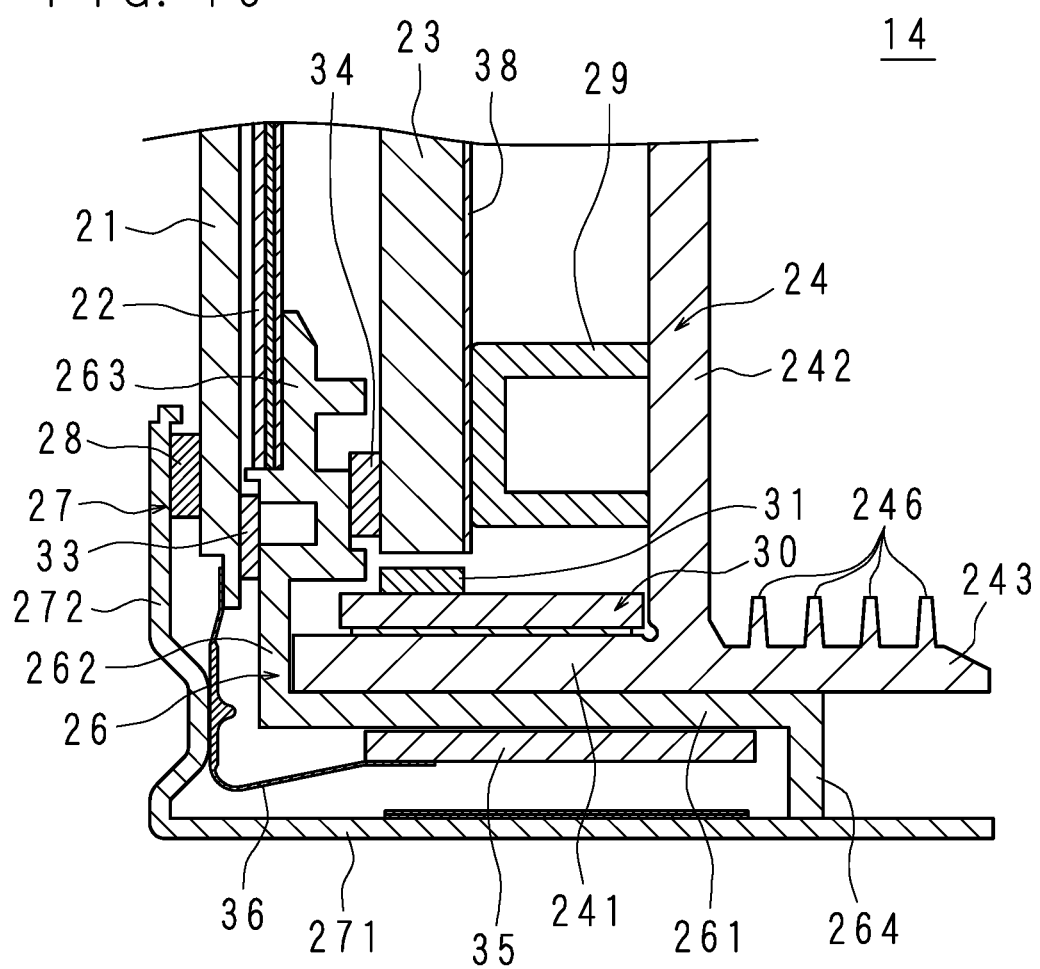
FIG. 10 is a partial sectional view in the longitudinal direction illustrating a display module according to Embodiment 6 of the present invention.

FIG. 10 is a partial sectional view in the longitudinal direction illustrating the display module 14 according to Embodiment 6. In the drawing, the same parts as FIG. 4 will be denoted by the same reference numerals, and will not be described.

The holding plate 24 is made of, for example, aluminum, and includes a lower plate part 241 which covers the lower long side surface of the light guide plate 23, a back plate part 242 which is provided perpendicular to the lower plate part 241 and extends in the longitudinal direction of the light guide plate 23, and a mounting part 243 which protrudes rearward from an end portion of the back side of the lower plate part 241. The mounting part 243 extends along the lower end edge portion of the lower plate part 241. The mounting part 243 is provided with a plurality of female screws 244 (not illustrated), and a plurality of fins 246 are arranged in a back-front direction at portions in which the female screws 244 are not provided.

In the present embodiment, heat form the LEDs 31 are efficiently dissipated by the fins 246.

Embodiment 7

A display module 15 according to Embodiment 7 of the present invention has the same configuration as the display module 2 according to Embodiment 1, except that the shape of a holding member 26 is different therefrom.

Figure 11:
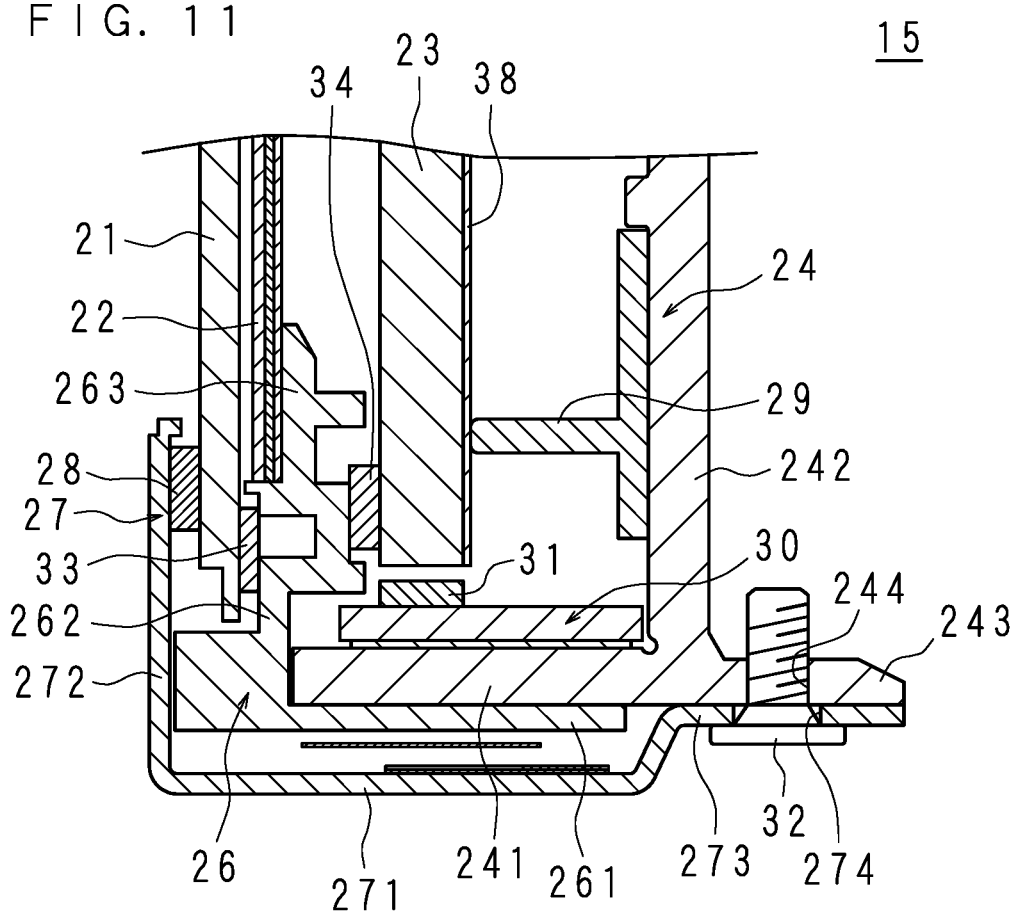
FIG. 11 is a partial cross-sectional view illustrating a display module according to Embodiment 7 of the present invention.

FIG. 11 is a partial cross-sectional view illustrating the display module 15 according to Embodiment 7. In the drawing, the same parts as FIG. 4 will be denoted by the same reference numerals, and will not be described.

The holding plate 24 is made of, for example, aluminum, and includes a lower plate part 241 which covers the lower long side surface of the light guide plate 23, a back plate part 242 which is provided perpendicular to the lower plate part 241 and extends in the longitudinal direction of the light guide plate 23, and a mounting part 243 which protrudes rearward from an end portion of the back side of the lower plate part 241. The mounting part 243 is provided with a plurality of female screws 244.

The holding member 26 is a frame body formed in an L shape in the side view, and has a lower plate part 261, a panel abutting part 262, and a sheet abutting part 263. Unlike the holding member 26 according to Embodiment 1, the holding member does not have the bezel abutting part 264.

The lower plate part 261 abuts on the lower plate part 241 of the holding plate 24 to support the lower plate part 241. A source substrate (not illustrated) is disposed to a lower surface of the lower plate part 261.

The panel abutting part 262 has an erected part which is erected on the lower plate part 261, and an abutting part which extends from an upper side of the erected part and is formed in a lateral U shape in the side view. In a state in which the buffer member 33 is applied to a U-shaped opening portion of the abutting part, the abutting part abuts on the lower end edge part of the back surface of the display panel 21 to support the display panel 21. In addition, an upper surface of the abutting part abuts on the lower surface of the optical sheet group 22 to support the optical sheet group 22.

The sheet abutting part 263 extends from an upper side of the panel abutting part 262, and abuts on the lower portion of the back surface of the optical sheet group 22.

The bezel 27 is a frame body formed in an L shape in the side view, and has a side plate 271, a front plate 272, and a screw head locking 273. The side plate 271 extends in the horizontal direction, and covers the source substrate and the lower plate part 261 of the holding member 26. The front plate 272 is provided perpendicular to the side plate 271, and the back surface thereof abuts on the lower end edge part of the front surface of display panel 21 through the buffer member 28.

The side plate 271 is provided with the screw head locking 273 at an end portion of the back side thereof, which extends rearward with being recessed inwardly. The screw head locking 273 is provided with a screw insertion hole 274.

In the present embodiment, the bezel 27 is mounted to the holding plate 24, by inserting the screw 32 into the screw insertion hole 274 to be screwed to the female screw 244 of the mounting part 243. That is, without newly providing a member, by changing the shape of the holding plate 24, the mounting structure of the bezel 27 to the holding plate 24 is obtained, as well as, it is possible to minimize the positional shift between the female screw 244 and the screw insertion hole 274, and maintain a strength of fixation.

The fastening position of the screw 32 is apart from the portion in which the LED substrate 30 is disposed to have a complicated mounting structure, such that it is possible to easily and reliably fix the bezel 27 to the holding plate 24, without being restricted to the arrangement of the source substrate. Further, it is possible to narrow the frame, and cope with an increase in the size of the source substrate.

Embodiment 8

A display module 16 according to Embodiment 8 of the present invention has the same configuration as the display module 2 according to Embodiment 1, except that the shape of a bezel 27 is different therefrom.

Figure 12:
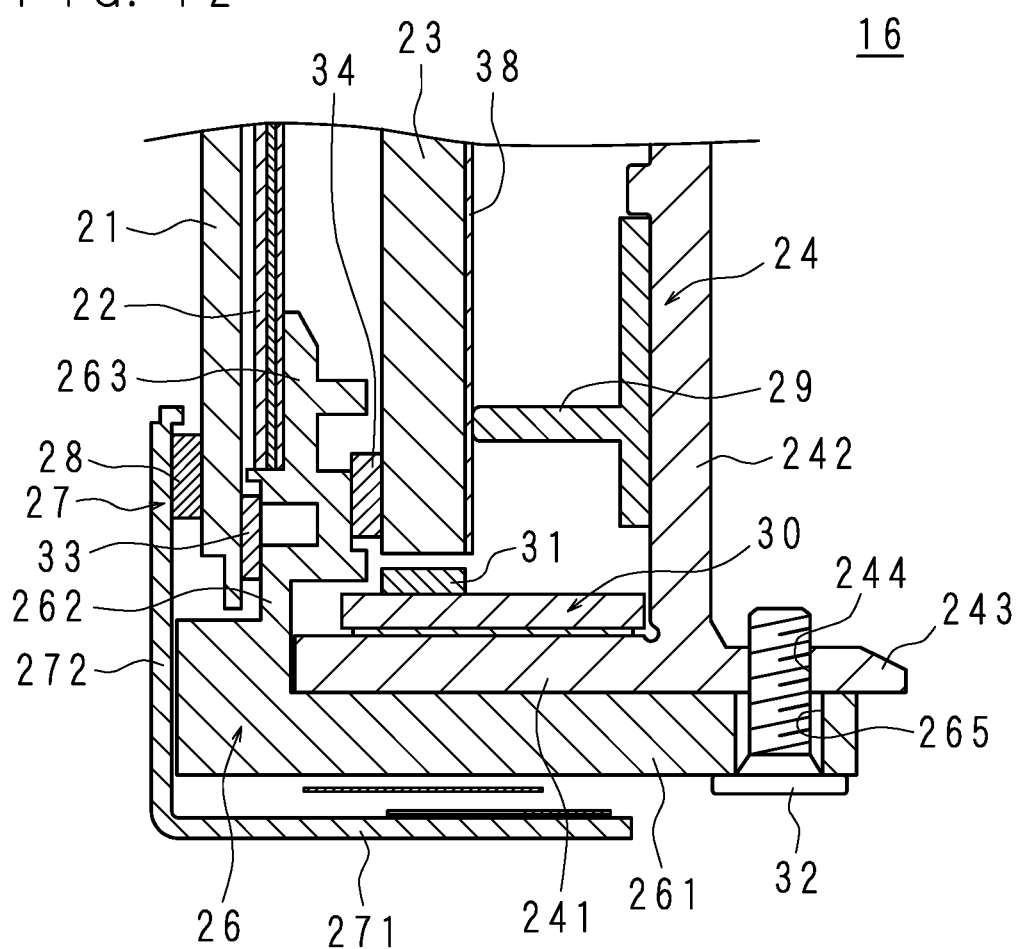
FIG. 12 is a partial sectional view in the longitudinal direction illustrating a display module according to Embodiment 8 of the present invention.
Figure 13:
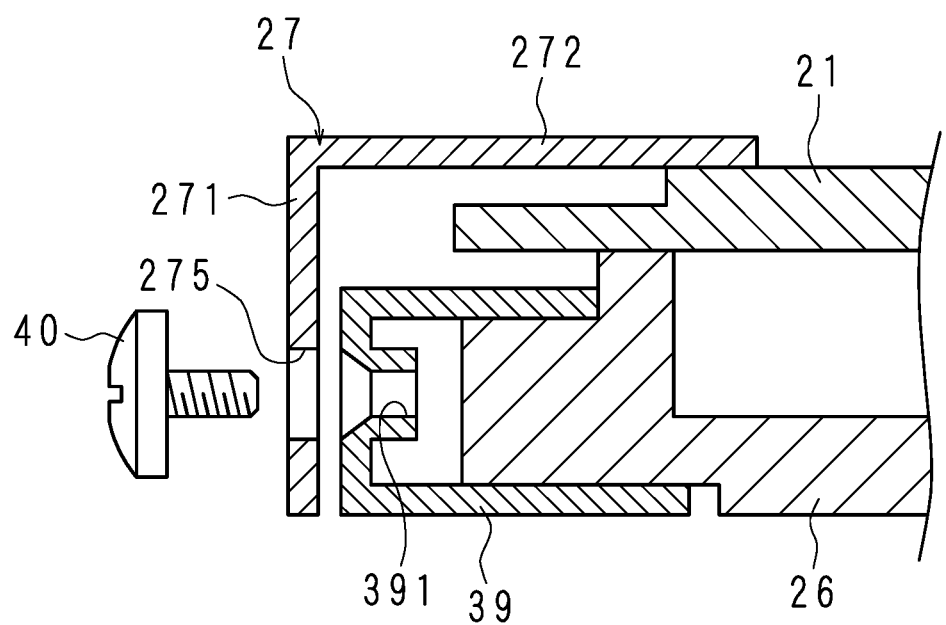
FIG. 13 is a partial cross-sectional view illustrating a liquid crystal display apparatus of Japanese Patent Laid-Open Publication No. 2001-356321.
Figure 14:
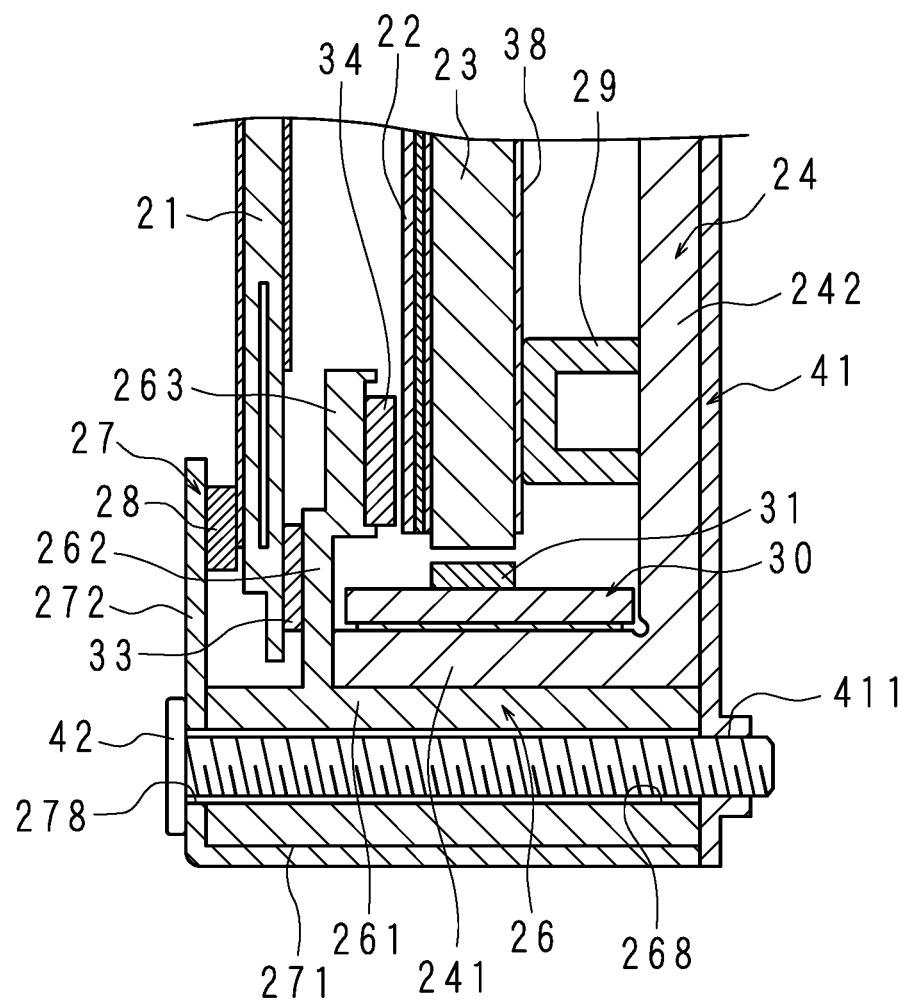
FIG. 14 is a partial sectional view in the longitudinal direction illustrating another conventional display module.

FIG. 12 is a partial sectional view in the longitudinal direction illustrating the display module 16 according to Embodiment 8. In the drawing, the same parts as FIG. 4 will be denoted by the same reference numerals, and will not be described.

The holding plate 24 is made of, for example, aluminum, and includes a lower plate part 241, a back plate part 242, and a mounting part 243 which protrudes rearward from the end portion of the back side of the lower plate part 241. The mounting part 243 is provided with a plurality of female screws 244.

The holding member 26 is a frame body formed in an L shape in the side view, and has a lower plate part 261, a panel abutting part 262, a sheet abutting part 263, and a screw insertion hole 265. Unlike the holding member 26 according to Embodiment 1, the holding member does not have the bezel abutting part 264.

The lower plate part 261 abuts on the lower plate part 241 of the holding plate 24 to support the lower plate part 241. A plurality of source substrates (not illustrated) are disposed to the lower surface of the lower plate part 261. The lower plate part 261 is provided with the plurality of screw insertion holes 265 in the end portion of the back side thereof.

The panel abutting part 262 has an erected part which is erected on the lower plate part 261, and an abutting part which extends from an upper side of the erected part and is formed in a lateral U shape in the side view. In a state in which the buffer member 33 is applied to a U-shaped opening portion of the abutting part, the abutting part abuts on the lower end edge part of the back surface of the display panel 21 to support the display panel 21. In addition, an upper surface of the abutting part abuts on the lower surface of the optical sheet group 22 to support the optical sheet group 22.

The sheet abutting part 263 extends from an upper side of the panel abutting part 262, and abuts the lower portion of the back surface of the optical sheet group 22.

The bezel 27 is a frame body formed in an L shape in the side view, and has a side plate 271, and a front plate 272. Unlike the display module 2 according to Embodiment 1, the bezel 27 does not have the screw head locking 273. The side plate 271 extends in the horizontal direction, and covers the source substrate and the lower plate part 261 of the holding member 26. The front plate 272 is provided perpendicular to the side plate 271, and the back surface thereof abuts the lower end edge part of the front surface of display panel 21 through the buffer member 28.

In the present embodiment, the holding member 26 is mounted to the holding plate 24, by inserting the screw 32 into the screw insertion hole 265 to be screwed to the female screw 244 of the mounting part 243. That is, without newly providing a member, by changing the shape of the holding plate 24, the mounting structure of the holding member 26 to the holding plate 24 is obtained, as well as, it is possible to minimize the positional shift between the female screw 244 and the screw insertion hole 265, and maintain a strength of fixation.

The fastening position of the screw 32 is apart from the portion in which the LED substrate 30 is disposed to have a complicated mounting structure, such that it is possible to easily and reliably fix the holding member 26 to the holding plate 24, without being restricted to the arrangement of the source substrate. Further, it is possible to narrow the frame, and cope with an increase in the size of the source substrate.

It should be understood that Embodiments 1 to 8 disclosed herein are illustrative and non-restrictive in every respect. Since the scope of the present invention is defined by the appended claims rather than by the description preceding them, and all changes that fall within metes and bounds of the claims, or equivalence of such metes and bounds thereof are therefore intended to be embraced by the claims.

For example, in the above-described Embodiments 1 to 8, the case in which the display module 2 of the TV receiving apparatus 1 is an edge light type from one side has been described, but it is not limited thereto. The present invention may also be applied to an edge light type display module from both sides.

In addition, the case in which the LED substrate 30 is disposed to face the long side surface side of the light guide plate 23 has been described, but it is not limited thereto. The present invention may be applied to a case in which the LED substrate 30 is disposed to face a short side surface of the light guide plate 23, and may also be applied to a case in which a gate substrate is disposed to the outer surface of the holding member 26.

Further, the present invention is not limited to the case in which the LED substrate 30 is held by the holding plate 24, and by using a chassis having a side plate on a lower side thereof, the LED substrate 30 may be held on the side plate.

In this case, by including a mounting part which protrudes rearward from an end portion of the back side of the side plate, at least one of the bezel 27 and the holding member 26 may be mounted to the mounting part.

Furthermore, in the above-described Embodiments 1 to 8, the case of using the screw 32 as a fastener has been described, but it is not limited thereto, and a pin or the like may be used.

Furthermore, it is to be noted that, as used herein and in the appended claims, the singular forms "a", "an", and "the" include plural referents unless the context clearly dictates otherwise.

The invention claimed is:

1. A display apparatus comprising: a light guide plate, a holding plate which holds a substrate having a plurality of light emitting elements, and is disposed to face a side surface of the light guide plate, a display panel disposed to face a main surface of the light guide plate, a holding member which holds the display panel and covers the holding plate, and a bezel which covers a peripheral edge part of the display panel and the holding member, wherein the holding plate is provided with a mounting part which extends and protrudes in a direction which is away from the display panel, the holding member is provided with a bezel abutting part which protrudes in a direction close to the bezel and abuts on the rear surface of the bezel, and both of the holding member and the bezel are mounted to the mounting part by a fastener;

wherein the fastener is a screw, a female screw is formed in the mounting part, and the bezel has a screw head locking at which a peripheral edge part of a head portion of the screw is locked and a screw insertion hole into which a leg of the screw is inserted, wherein the bezel abutting part abuts on the screw head locking, and in a state in which the peripheral edge part is locked at the screw head locking and the leg is inserted into the screw insertion hole, the screw is screwed to the female screw.

2. The display apparatus according to claim 1, wherein in the case where a plurality of driving circuit boards to drive the display panel are placed on the holding member at the outside of the portion with which the holding plate is covered, a fastening portion by the screw is between adjacent driving circuit boards.

3. The display apparatus according to claim 2, wherein a concave is formed at a portion at which the driving circuit board faces toward the adjacent driving circuit board.

4. The display apparatus according to claim 1, wherein in the case where a plurality of driving circuit boards to drive the display panel are placed on the holding member at the outside of the portion with which the holding plate is covered, a fastening portion by the screw is an end portion in the longitudinal direction of the holding member, in which the driving circuit board is not provided.

5. The display apparatus according to claim 1, wherein in the case where a plurality of driving circuit boards to drive the display panel are placed on the holding member at the outside of the portion with which the holding plate is covered, a fastening portion by the screw is a distal portion from the display panel, with respect to the portion in which the driving circuit board of the holding member is provided.

6. The display apparatus according to claim 1, wherein the mounting part is provided with a second bezel abutting part which protrudes in a direction close to the bezel and abuts on the rear face of the screw head locking.

7. The display apparatus according to claim 2, wherein the mounting part is provided with a second bezel abutting part which protrudes in a direction close to the bezel and abuts on the rear face of the screw head locking.

8. The display apparatus according to claim 5, wherein the mounting part is provided with a second bezel abutting part which protrudes in a direction close to the bezel and abuts on the rear face of the screw head locking.

9. The display apparatus according to claim 1, wherein the bezel abutting part has a shape for the screw to be inserted into the bezel abutting part.

10. The display apparatus according to claim 2, wherein the bezel abutting part has a shape for the screw to be inserted into the bezel abutting part.

11. The display apparatus according to claim 3, wherein the bezel abutting part has a shape for the screw to be inserted into the bezel abutting part.

12. The display apparatus according to claim 5, wherein the bezel abutting part has a shape for the screw to be inserted into the bezel abutting part.

13. The display apparatus according to claim 1, comprising a covering plate which covers a flat surface of the light guide plate, and is provided perpendicular to the holding plate.

14. The display apparatus according to claim 2, comprising a covering plate which covers a flat surface of the light guide plate, and is provided perpendicular to the holding plate.

15. The display apparatus according to claim 5, comprising a covering plate which covers a flat surface of the light guide plate, and is provided perpendicular to the holding plate.

16. The display apparatus according to claim 1, wherein the mounting part is provided with fins to dissipate heat.

17. The display apparatus according to claim 2, wherein the mounting part is provided with fins to dissipate heat.

18. The display apparatus according to claim 5, wherein the mounting part is provided with fins to dissipate heat.

* * * * *